United States Patent [19]

Tanaka et al.

[11] Patent Number: 4,837,687
[45] Date of Patent: Jun. 6, 1989

[54] METHOD FOR ANALYZING AN AUTORADIOGRAPH

[75] Inventors: Kazuyoshi Tanaka, Tokyo; Masakazu Hashiue, Kaisei, both of Japan

[73] Assignee: Fuji Photo Film Co. Ltd., Kanagawa, Japan

[21] Appl. No.: 844,967

[22] Filed: Mar. 27, 1986

[30] Foreign Application Priority Data

Mar. 27, 1985 [JP] Japan .................................. 60-62298
Mar. 27, 1985 [JP] Japan .................................. 60-62299

[51] Int. Cl.⁴ ..................... G01N 33/50; G01N 33/58; C12Q 1/68
[52] U.S. Cl. .................. 364/413.01; 358/111
[58] Field of Search .................... 364/414; 435/6, 808; 935/77, 78, 86, 87; 358/111; 250/327

[56] References Cited

U.S. PATENT DOCUMENTS 4,731,63  3/1988  Sczan et al. ..................... 364/414 X
4,496,973  1/1985  Horikawa et al. ............... 364/414 X
4,665,312  5/1987  Shiraishi ............................ 250/303

Primary Examiner—Jerry Smith
Assistant Examiner—Charles B. Meyer
Attorney, Agent, or Firm—Gerald J. Ferguson, Jr.

[57] ABSTRACT

A method for analyzing autoradiography by subjecting digital signals corresponding to an autoradiograph having information on two-dimensional location of radioactively labeled substances resolved on a support medium to signal processing, to obtain the locational information on the radioactively labeled substances in the form of visual indicia, which includes the steps of:

(1) electrically displaying the autoradiograph in the form of an image on the basis of the digital signals;
(2) extracting signals in a given area along resolved rows of the radioactively labeled substances on the basis of input information on the rows determined from the display image; and
(3) subjecting the extracted signals to one-dimensional signal processing to detect resolved portions.

35 Claims, 2 Drawing Sheets (a)

METHOD FOR ANALYZING AN AUTORADIOGRAPH

BACKGROUND OF THE INVENTION

1. Field of the Invention

This invention relates to a method for analyzing autoradiograph. 2. Description of the Prior Arts Autoradiography has been known as a method for obtaining locational information on radioactively labeled substances which are distributed in at least one-dimensional direction to form rows on a support medium.

For instance, the autoradiography comprises the steps of: labeling organism-originating biopolymers such as proteins or nucleic acids with a radioactive element; resolving the radioactively labeled biopolymers, derivatives thereof, cleavage products thereof or synthetic products thereof on a support medium through a resolving process such as gel electrophoresis; placing the support medium and a high-speed X-ray film together in layers for a certain period of time to expose the film; developing said film; obtaining the locational information on the radioactively labeled substances from the developed film; and then performing the identification of the polymeric substances, determination of molecular weight thereof or isolation thereof based on the obtained locational information.

Recently, the autoradiography has been effectively used especially for determining the base sequence of a nucleic acid such as DNA or RNA. Further, the autoradiography has been used as an essential means in the screening of gene wherein a hybridization method such as southern blotting, northern blotting or western blotting is employed.

Japanese Patent provisional Publication No. 59(1984)-83057 and No. 60(1985)-10174 and Japanese Patent Application No. 58(1983)-173393 disclose a radiation image recording and reproducing method using a stimulable phosphor sheet in place of a conventional radiography using a radiosensitive material such as an X-ray film. Said method comprises causing a stimulable phosphor in the stimulable phosphor sheet to absorb radiation energy and exciting the stimulable phosphor with an electromagnetic wave (stimulating rays) such as visible light or infrared rays to release the radiation energy from the phosphor sheet as light emission. This method enables exposure time to be greatly shortened and does not suffer chemical fog which is a problem associated with the conventional radiography. Further, this method has an advantage in that the autoradiograph having locational information on the radioactively labeled substances can be obtained in the form of symbols and/or numerals in addition to a visible image, because the autoradiograph can be stored in the phosphor sheet as the radiation energy and read out as stimulated emission in time sequence.

The analysis of the autoradiograph has been, heretofore, made by a person in such a manner that they have detected the distribution of the radioactively labeled substances on the support medium by observing a visualized autoradiograph with own eyes to obtain the locational information (and further informations such as the identification of the biopolymer, the molecular weight thereof and characteristics thereof based on the locational information) on the specific substances labeled radioactively. For instance, the base sequence of DNA is determined by measuring resolved portions of radioactively labeled base-specific DNA fragments or a mixture thereof with eyes and comparing the resolved portions among resolved rows of the DNA fragments with each other. Accordingly, the analysis of the autoradiograph requires a great deal of work and time.

Further, the locational information obtained by the analysis of the autoradiograph varies depending on the person in charge because of inherent unreliability of visual observation, and the accuracy of the information is limited to a certain extent.

There have been previously proposed some methods for automatically obtaining locational information on the radioactively labeled substances in the form of symbols and/or numerals by converting the autoradiograph having the locational information on the labeled substances distributed in at least one-dimensional direction on a support medium into digital signals and subjecting the digital signals to appropriate signal processing (see, Japanese Patent Provisional Publication No. 59(1984)-126527, No. 59(1984)-126278, etc.). Said digital signals corresponding to the autoradiograph can be obtained by visualizing the autoradiograph on a radiographic film according to the conventional radiography and photoelectrically reading out it by means of reflected light or transmitted light. Alternatively, when a stimulable phosphor sheet is used, said digital signals can be obtained by directly reading out the autoradiograph recorded on the phosphor sheet.

SUMMARY OF THE INVENTION

The present inventors have found that in a method for analyzing an autoradiograph having information on two-dimensional location of radioactively labeled substances resolved (developed) on a support medium, the desired locational information can be obtained with high accuracy by inputting only information required for the analysis and displaying locational information in each step of the signal processing based on the inputted information, instead of completely automating the signal processing of digital signals corresponding to the autoradiograph.

The present invention provides in the first aspect a method for analyzing autoradiograph by subjecting digital signals corresponding to an autoradiograph having information on two-dimensional location of radioactively labeled substances resolved on a support medium to signal processing, to obtain the locational information on the radioactively labeled substances in the form of symbols and/or numerals, which includes the steps of:

(1) electrically displaying the autoradiograph in the form of an image on the basis of the digital signals;

(2) extracting signals in a given area along resolved rows of the radioactively labeled substances on the basis of input information on the rows determined from the display image; and (3) subjecting the extracted signals to one-dimensional signal processing to detect resolved portions.

Further, the inventors have found that even when a smiling phenomenon and/or offset distortion occurs on a resolved pattern, the desired locational information can be obtained with high accuracy.

The present invention provides in the second aspect a method for analyzing autoradiograph by subjecting digital signals corresponding to an autoradiograph having information on two-dimensional location of radioactively labeled substances resolved on a support medium to signal processing, to obtain the locational information on the radioactively labeled substances in the form of symbols and/or numerals, which includes the steps of:

(1) electrically displaying the autoradiograph in the form of an image on the basis of the digital signals;

(2) extracting signals in a given area along resolved rows of the radioactively labeled substances on the basis of input information on the rows determined from the display image;

(3) subjecting the extracted signals to one-dimensional signal processing to detect resolved portions and displaying them in the superposed form; and (4) making correction for resolving distance on signals corresponding to the resolved portions on the basis of input information on location of one resolved portion determined from the display image, in the third aspect, a method for analyzing autoradiograph which includes the steps of:

(1) electrically displaying the autoradiograph in the form of an image on the basis of the digital signals;

(2) extracting signals in a given area along resolved rows of the radioactively labeled substances on the basis of input information on the rows determined from the display image;

(3) subjecting the extracted signals to one-dimensional signal processing to detect resolved portions and displaying them in the superposed form; and (4) making correction for resolution-starting position on signals corresponding to the resolved portions on the basis of input information on location of one resolved portion determined from the display image, in the fourth aspect, a method for analyzing autoradiograph which includes the steps of:

(1) electrically displaying the autoradiograph in the form of an image on the basis of the digital signals;

(2) extracting signals in a given area along resolved rows of the radioactively labeled substances on the basis of input information on the rows determined from the display image;

(3) subjecting the extracted signals to one-dimensional signal processing to detect resolved portions and displaying them in the superposed form;

(4) making correction for resolving distance on signals corresponding to the resolved portions on the basis of input information on location of one resolved portion determined from the display image and displaying them in the superposed form; and (5) making correction for resolution-starting position on the distance-corrected signals on the basis of input information on location of one resolved portion determined from the display image, and in the fifth aspect, a method for analyzing autoradiograph which includes the steps of:

(1) electrically displaying the autoradiograph in the form of an image on the basis of the digital signals;

(2) extracting signals in a given area along resolved rows of the radioactively labeled substances on the basis of input information on the rows determined from the display image;

(3) subjecting the extracted signals to one-dimensional signal processing to detect resolved portions and displaying them in the superposed form;

(4) making correction for resolution-starting position on signals corresponding to the resolved portions on the basis of input information on location of one resolved portion determined from the display image and displaying them in the superposed form; and (5) making correction for resolving distance on the starting position-corrected signals on the basis of input information on location of one resolved portion determined from the display image.

In the present invention, the term "locational information" on the radioactively labeled substances resolved on the support medium means to include a variety of information relating to the location of the labeled substances or the aggregation thereof, being present in the support medium, such as the location, the shape, the concentration, the distribution and combinations thereof.

BRIEF DESCRIPTION OF DRAWINGS

FIG. 1-(a) shows an example of a resolved pattern which is distorted, and FIG. 1-(b) shows an example of a resolved pattern which is subjected to pattern rotating processing.

FIG. 2-(a) shows an example of a resolved row which is distorted, and FIG. 2-(b) shows an example of the resolved row which is determined with a cursor line.

DETAILED DESCRIPTION OF THE INVENTION

In the present invention, the digital signals corresponding to the autoradiograph having the locational information on the radioactively labeled substances, are processed in an appropriate circuit having a function of signal processing to obtain semi-automatically the locational information on the labeled substances in the form of symbols and/or numerals. When appropriate operational processing and other related informations are applied to the locational information in the form of symbols and/or numerals in said signal processing circuit, the further desired information, for example, the base sequence of DNA can be semi-automatically obtained.

The present inventors have studied on the analysis of an autoradiograph employed in micro-analysis of proteins, determination of the base sequence of a nucleic acid or the like, and found that the autoradiograph of the radioactively labeled substances resolved on a support medium, which are an object, usually causes various distortion or noise due to impurities. For instance, there are distortion of the overall resolved pattern which is caused by insufficient positioning of a radiosensitive material (or a stimulable phosphor sheet) and a support medium during exposure; appearance of a smiling phenomenon and zigzag of a resolved row which is caused by non-constant resolving conditions or the non-uniform support medium; offset distortion caused by the dependence on the deposition operation of a sample on the support medium; and occurrence of noise due to a natural radiation or a radiation radiating from radioactive impurities.

In order to automatically recognize and make correction (compensation) for the distortion or noise appearring on the autoradiograph on digital image data corresponding thereto in the course of the autoradiographic analysis, a high-speed and large-capacity automatic electronic computer is required and it is not always assured that the analysis result can be obtained with high accuracy.

The autoradiographic analysis according to the present invention is carried out, not by the completely automated processing for the digital signals corresponding the autoradiograph, which is obtained by reading out a radiosensitive material or a stimulable phosphor sheet, but by obtaining necessary information on the above-described distortion and processing the digital signals suitably and efficiently on the basis of said information. As a result, labor and time required of analysts in the conventional manual method can be greatly reduced and at the same time, the analysis can be made with high accuracy and high efficiency as compared with the completely automated analysis. Namely, the desired locational information can be simply obtained with high reliability by semi-automating the analysis operation.

More in detail, since the autoradiograph based on the digital signals is displayed as an image on CRT, etc., the analyst can judge the necessary information from the display image and give the information, whereby the signal processing at each step is carried out. Particularly, the resolved rows of the radioactively labeled substances are often zigzagged by conditions of resolution such as electrophoresis, fluctuation of a support medium as such and exposure conditions. Further, there are differences in the size, the shape and the central position of the resolved portion between individuals. Accordingly, when the information on the resolved rows is input prior to signal processing, the accuracy in the subsequent signal processing for the determination of the resolved portion can be enhanced.

The signal-processed digital image data are displayed at each step in the form of superposing them on the autoradiograph not signal-processed, so that the analyst can give a further instruction for carrying out necessary processing by judging from the display image. For example, when electrophoresis is used as a resolution method, there is generally a tendency to cause a phenomenon (called "smiling phenomenon") in which migration distance at the both ends of the support medium becomes shorter than that in the central part thereof by heat dissipation (called "edge effect") during the resolution. In the invention, correction (compensation) for the smiling phenomenon can be simply made with high accuracy by inputting information on the position of arbitrary one resolved portion for every resolved row.

There is also apt to cause a locational deviation between the resolved rows ("offset distortion"), because a lot of slots (sample charging port) provided on the upper edge of a support medium such as a gel medium differ from one another in shape (size of recess); positions on which samples are deposited are slipped from each other; or the penetration rate is different between the slots owing to insufficient washing of the gel medium for removing urea just before sample charging, so that a difference in a starting position or starting time for resolution between the slots takes place. In the invention, correction for this offset distortion can be simply made with high accuracy by inputting information on the starting position of the resolved row.

Either or both of the correction for the smiling phenomenon and the correction for the offset distortion are made on the digital signals according to distortion appearred on the autoradiograph. When both corrections are made, the desired locational information can be obtained whichever correction is previously made.

In addition, digital image data signal-processed at each step can be displayed on a screen so that it is possible to confirm whether the analysis is made in good order at each step. Particularly, the locational information on the radioactively labeled substances obtained at the final step can be compared with the displayed autoradiograph by the analyst, so that partial modification can be artificially made before the final analytical result is given.

Therefore, in the present invention, the digital signal processing for analyzing the autoradiograph is semi-automated and the processing function can be suitably controlled, so that the autoradiographic analysis can be made with high reliability.

The present invention will be described hereinafter more in detail.

Examples of samples which can be resolved in the invention include radioactively labeled biopolymers originating from organisms such as proteins, nucleic acids, derivatives thereof, cleavage products thereof and synthetic products thereof. The samples can be obtained by radioactively labeling the biopolymers with a radioactive element such as $^{32}P$, $^{14}C$, $^{36}S$, $^{3}H$ or $^{125}I$ by an appropriate method. When the samples are these biopolymers, the invention can be effectively used for the isolation thereof, the determination of molecular weight thereof or the identification of molecular structure thereof. However, the samples to be subjected to the autoradiographic analysis of the invention are by no means limited to the biopolymers.

The radioactively labeled substances (samples) are resolved (developed) on a support medium such as a gel support medium by using a known resolving (developing) method such as electrophoresis, a thin layer chromatography, a column chromatography or a paper chromatography.

The support medium on which the radioactively labeled substances are resolved, is autoradiographed to obtain the autoradiograph of the radioactively labeled substances by means of the conventional radiography using a radiosensitive material or the radiation image recording and reproducing method using a stimulable phosphor sheet. The digital signals corresponding to the autoradiograph of the labeled substances can be then obtained through an appropriate read-out system.

When the conventional radiography is used, the support medium and a radiosensitive material such as a X-ray film are placed together in layers at a low temperature of $-90°$ to $-70°$ C. for a long period of time (several tens of hours) to expose the radiographic film. The radiographic film is then developed to visualize the autoradiograph of the radioactively labeled substances on the film, and the visualized autoradiograph is read out by using an image read-out system. For instance, the radiographic film is irradiated with a light beam and the light transmitted thereby or reflected therefrom is photoelectrically detected, whereby the autoradiograph can be obtained as electric signals. Further, digital signals corresponding to the electric signals are obtained through A/D conversion.

When the radiation image recording and reproducing method is used, the support medium and the stimulable phosphor sheet are placed together in layers at an ambient temperature for a short period of time (several seconds to several tens of minutes) to store radiation energy radiating from the radioactively labeled substances in the phosphor sheet, whereby the autoradiograph is recorded as a kind of a latent image (energy-stored image) on the phosphor sheet. The stimulable phosphor sheet has a basic structure where a support comprising, for instance, a plastic film, a phosphor layer comprising a stimulable phosphor such as a divalent europium activated barium fluorobromide phosphor (BaFBr:Eu$^{2+}$) and a transparent protective film are laminated in this order. The stimulable phosphor contained in the stimulable phosphor sheet has such characteristics that the phosphor absorbs and stores radiation energy emitted by the labeled substances when irradiated with a radiation such as X-rays and then releases the stored radiation energy as stimulated emission when excited with visible light to infrared rays.

Subsequently, the autoradiograph stored and recorded on the stimulable phosphor sheet is read out by using a read-out system. For instance, the phosphor sheet is scanned with a laser beam to release the radiation energy stored in the stimulable phosphor as light emission and the emitted light is photoelectrically detected, so that the autoradiograph can be directly obtained as electric signals without the visualization of the autoradiograph. Further, digital signals corresponding to the autoradiograph can be obtained from the electric signals through A/D conversion.

In the above read-out procedures, it is not always necessary to conduct the read-out operation of the autoradiograph all over the surface of the radiographic film or the stimulable phosphor sheet. Only the image region may be subjected to the read-out operation.

The obtained digital signals $D_{xy}$ comprise a coordinate (x,y) which is represented by a coordinate system defined by the radiographic film or the stimulable phosphor sheet and a signal level (z) at the coordinate. The signal level represents the density of image at the coordinate, that is, the amount of the radioactively labeled substances. Accordingly, a series of the digital signals (that is, digital image data) have information on two-dimensional location of the labeled substances.

The above-described methods for measuring the autoradiograph and obtaining the digital signals corresponding thereto are disclosed in more detail in the aforementioned Japanese Patent Provisional Publications No. 59(1984)-83057, No. 59(1984)-126527 and No. 59(1984)-126278.

While the methods for obtaining the digital signals corresponding to the autoradiograph using the conventional radiography and the radiation image recording and reproducing method are described above, the present invention is not limited thereto and digital signals obtained by any other methods can be applied to the autoradiographic analysis of the invention, provided that they correspond to the autoradiograph.

The thus-obtained digital signals corresponding to the autoradiograph having the locational information on the radioactively labeled substances resolved on a support medium are subjected to the signal processing according to the present invention to thereby conduct the analysis of the autoradiograph.

The digital signals are stored temporarily in a memory device (that is, stored in a non-volatile memory unit such as a buffer memory, a magnetic memory, etc.).

In the first step of the processing, the autoradiograph (the resolved pattern of the radioactively labeled substances) are displayed as an image on the basis of the digital signals on a display device such as CRT connected to the signal processing circuit. The digital signals may be previously processed (image-processed) so as to give a well readable visible image having well adjusted concentration and contrast. Examples of the image processing include spatial frequency processing, gradation processing, addition average processing, reduction processing and enlarging processing.

In the second step of the processing, each resolved row (lane) is determined and digital image data are made one-dimentional.

Figure 1:
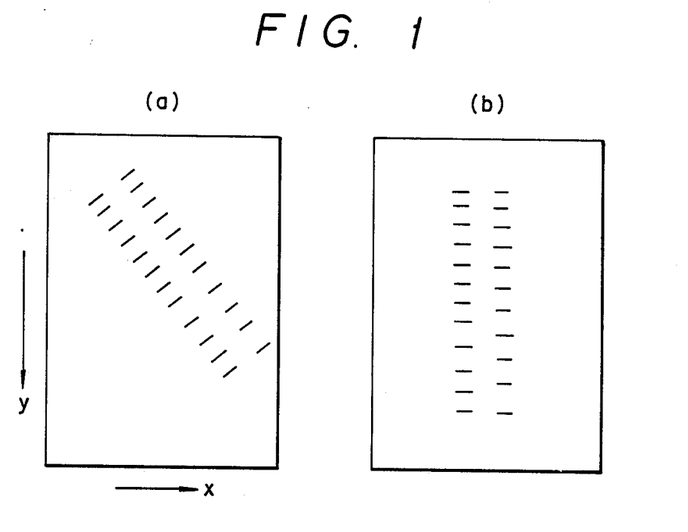

When the whole of the displayed resolved pattern is sloped due to false registration in the exposure operation as shown in FIG. 1-(a), the pattern can be corrected to an erect image (see, FIG. 1-(b)) by previously rotating the pattern.

FIG. 1-(a) and (b) show an example of the resolved pattern of the radioactively labeled substances displayed as an image.

For instance, the rotation of the pattern is made in such a manner that information on necessary quantity of rotation (rotation angle, direction, etc.), which is determined from the display image is input into the signal processing circuit and then signal processing for pattern rotating is carried out on the setting condition of the input information. The input of information can be made by a keyboard operation, a joystick operation or an operation with an input member such as light pen on the screen.

More in detail, the digital signals $D_{xy}$ are subjected to coordinate rotation processing (x→x' and y→y') on the basis of the input information to thereby convert the digital signals $D_{xy}$ into signals $D'_{xy}$. The rotated resolved pattern based on the resulting digital signals $D'_{xy}$ is displayed as an original pattern on the screen.

A cursor line is displayed on the screen wherein the elect image is displayed and information on the lane is input by using the cursor line. First, the displayed cursor line is moved so as to superpose it on one lane. The moving of the cursor line can be done by the keyboard operation, the joystick operation or a touch pen operation on the screen. Preferably, the cursor line is gone on and off or displayed with a color different from that of the image to thereby discriminate it from the lane. Secondly, the cursor line is aligned with a straight line segment in the upper part of the lane (area between the center of the lane and the resolution starting position thereof) and fixed. When the cursor line is passed through the nearly central position of each resolved portion (band) on the lane, information on the lane which is located on the fixed cursor line is input into the processing circuit by a key operation.

Figure 2:
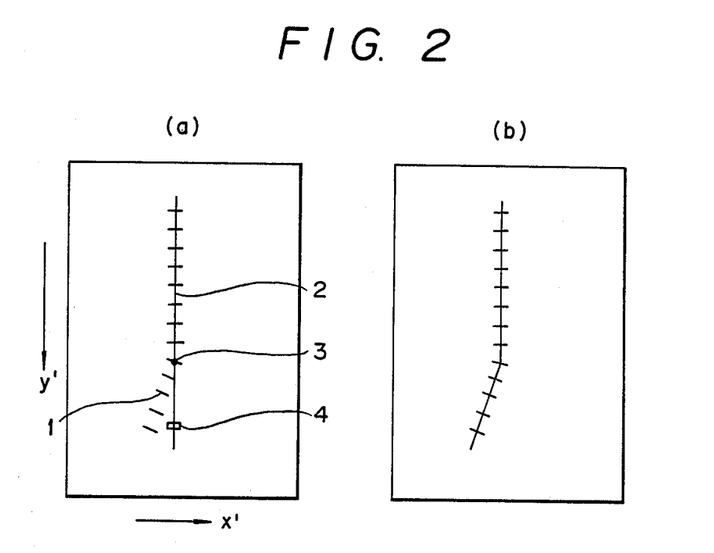

When the lane 1 is not in a straight line but in a curved (or zigzag) form so that the cursor line 2 is not aligned with the overall lane as shown in FIG. 2-(a), the correction of the cursor line is made on the screen and lane information is input. FIGS. 2-(a) and 2-(b) show an example of the lane of the radioactively labeled substances displayed as an image.

For instance, the correction of the cursor line by means of the keyboard operation is made as follows: the lowermost position 3 at which the cursor line 2 is aligned with the lane 1 is recognized and the straight cursor line segment up to the position 3 is fixed. The cursor point 4 is moved in the direction of y'-coordinate on the cursor line to a point at which the non-aligned line segment exists and subsequently, the cursor point 4 is moved in the direction of x'-coordinate to a point at which the lane exists without changing the y'-coordinate of the former point, whereby the cursor point is fixed. By this input operation, a new cursor line segment formed by drawing a straight line between the position 3 and the fixed cursor point is displayed. The lane may be cut into appropriate intervals and this operation may be repeatedly done against each interval. When each cursor line segment is nearly passed through the center of the band over the whole lane by the repeated operation, information on the lane which is located at the position of the finally obtained cursor line is input. Alternatively, the correction of the cursor line can be made by bringing a touch pen into touch with the center position of each band in the non-aligned zone on the screen.

Digital signals included in a given area along each lane are extracted based on the above lane information. Namely, digital signals on the cursor line and those within a given area around the cursor line are extracted. More in detail, there is extracted only digital signals $D''_{xy}$ having a coordinate $(x',y')$ in the given range. Each of the extracted signals $D''_{xy}$ can be expressed by a signal $D''_{ny}$ composed of the slot number (n) and the resolving coordinate $(y'')$. Accordingly, when the slot is fixed, the signals can be expressed only by the resolving coordinate $(y'')$ and hence, the two-dimensional information consisting of $(x',y')$ can be made one-dimensional with respect to each lane.

A representative profile of the resolved pattern can be obtained by this signal processing. The obtained profile can be confirmed by displaying the profile on the screen in the form of superposing it on the original pattern.

In the third step, one-dimensional signal processing is carried out against the representative profile. For instance, one-dimensional waveform (a graph in which the position on the lane is given on the abscissa and the signal level is given on the ordinate) is prepared for every lane on the basis of the extracted digital signals and peaks appeared on the waveform are picked up, whereby the position of each band can be detected. Further, the peak positions are compared with each other between the lanes, to obtain information on relative positions of the bands over the whole of the resolved pattern.

The one-dimensional signal processing for detecting the bands and determining the relative positions thereof is not limited to this one, and various operational processing can be also used therefor.

If desired, when the detected band peaks are superposed on the original pattern on the screen, the operator can confirm the resulting locational information by watching the superposed display on the screen. Further, the results of analysis may be simultaneously displayed in the form of symbols and/or numerals. It is also possible to partially modify the results of analysis, if necessary.

Now, an embodiment of the analysis of the autoradiograph according to the present invention will be described by referring to the determination of base sequence of DNA.

A mixture of radioactively labeled base-specific DNA fragments consisting of the following four groups:
(1) guanine (G)—specific DNA fragments,
(2) adenine (A)—specific DNA fragments,
(3) thymine (T)—specific DNA fragments, and
(4) cytosine (C)—specific DNA fragments, is resolved (developed) on a gel support medium by electrophoresis, and the sample (DNA fragments on the gel support) is autoradiographed to obtain an autoradiograph of a resolved pattern of the DNA fragments as digital signals. Each group of the above base-specific DNA fragments comprise base-specially cleaved or synthesized DNA fragments having different lengths and having the same base at their terminals. Digital signals corresponding to the autoradiograph are obtained by the radiation image recording and reproducing method using a stimulable phosphor sheet or the conventional radiography using a radiosensitive material, and stored in a memory device of a signal processing circuit.

Figure 3:
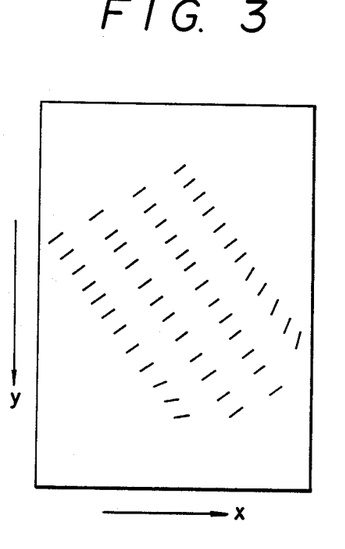
FIG. 3 shows an example of an electrophoretic pattern in which rotation distortion, offset distortion and a smiling phenomenon are caused.

In the first step, the autoradiograph to be analyzed is visualized on CRT on the basis of the obtained digital signals as shown in FIG. 3.

FIG. 3 shows an autoradiograph of an electrophoretic pattern in which the above four groups of the base-specific DNA fragments are electrophoresed in four slots. The pattern shows rotation distortion, offset distortion and a smiling phenomenon.

When the whole of the electrophoretic pattern is inclined as shown in FIG. 3, the rotating processing of pattern should be conducted for the digital signals. The digital signals $D_{xy}$ are subjected to the coordinate rotation processing based on the input information on the inclination of the pattern in the above-described manner to obtain digital signals $D'_{xy}$. The electrophoretic pattern (erect image) based on the resulting signals $D'_{xy}$ is displayed as an original on the screen.

Figure 4:
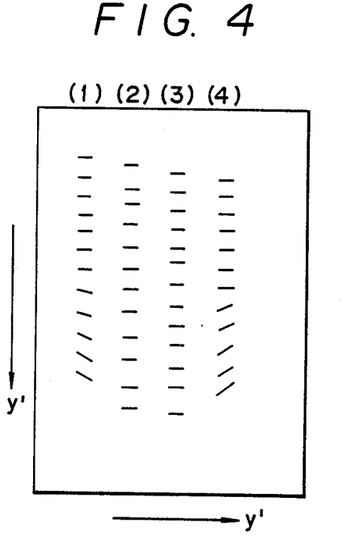
FIG. 4 shows an example of an electrophoretic pattern which is obtained by subjecting the pattern shown in FIG. 3 to rotating processing.

FIG. 4 shows an electrophoretic pattern which is obtained by subjecting the pattern shown in FIG. 3 to the rotating processing. The pattern shows the offset distortion and the smiling phenomenon as described below.

In the second step, digital signals within a given area along each lane are extracted (a representative profile is obtained) on the basis of input of lane information which is determined by using the cursor line on the screen, as described above.

Digital signals $D''_{xy}$ having given coordinates $(x',y')$, which are extracted on the basis of the lane information can be expressed by digital signals $D''_{ny}$ composed of the slot number (n) and the electrophoretic coordinate $(y'')$. Hence, the two-dimensional information consisting of $(x',y')$ can be made one-dimensional one consisting of only $(y'')$ for each lane, which means to obtain the representative profile of the pattern.

The representative profile can be confirmed by superposing the profile on the original pattern.

In the third step, the extracted digital signals $D''_{ny}$ are subjected to the one-dimensional signal processing for every slot. For instance, as described above, peaks on the one-dimensional waveform of each lane are picked up and all of bands $B_{ny}$ on the electrophoretic pattern are detected, wherein each of the bands $B_{ny}$ has information comprising the electrophoretic coordinate $(y'')$ and band intensity $(z'')$ in the n-th slot.

The bands $B_{ny}$ are displayed in the form of a point or a mimic band (band perpendicular to the electrophoretic direction) on the screen to be superposed on the pattern. In the case where the original pattern is zigzag, the bands may be superposed on such zigzag lanes, or on straight lanes after the zigzag form of the lanes are corrected to straight form.

Then, the electrophoretic pattern in which the offset distortion and the smiling phenomenon are caused as shown in FIG. 4 is corrected.

It can be generally judged whether the offset distortion is caused or not from that the whole of a lane in a displayed original pattern is uniformly located upward or downward. Occurrence of the smiling phenomenon can be judged from that lengths of lanes at both ends are shorter than those of lanes in central part in the displayed pattern and that bands (particularly, lower bands having long migration distance) of the lanes at both ends is not perpendicular (that is, not horizontal) to the electrophoretic direction (see, FIG. 4).

In the fourth step, digital signals corresponding to the detected bands are subjected to processing of correction for the offset distortion (correction for starting position of the electrophoresis) based on the input band information.

The cursor point is put upon a position of an arbitrary band on a lane where the offset distortion is caused, to recognize the position. The cursor point is then moved upward or downward along the lane against a lane serving as a reference and fixed to an appropriate position. By this operation, information on correction that said band position is changed to the cursor-fixed position (namely, the position into which the base-specific DNA fragment would be inherently electrophoresed, if the offset distortion was not caused) is input.

The electrophoretic coordinate y" of a band can be approximated with the formula (I).

$$y'' = at + b$$

wherein a is migration rate of band, t is migration time and b is coordinate at which electrophoresis is started.

This input information comprising the actual electrophoretic coordinate and the virtual electrophoretic coordinate is respectively substituted for the coordinate y" of the formula (I), a difference between the actual electrophoresis-starting position b and the virtual electrophoresis-starting position b' (starting position in the case where the offset distortion would not be caused) is calculated. The correction for the electrophoretic coordinate is made on all bands on the lane based on said difference, whereby the whole of the bands can be moved in parallel upward or downward. The results of the offset correction can be confirmed by superposing the corrected bands $B'_{ny}$ on the original pattern to fix the input information to the final. When the offset correction is not completely made (insufficient or over-corrected), the above-described operation can be repeated, whereby the desired information is finally input.

Figure 5:
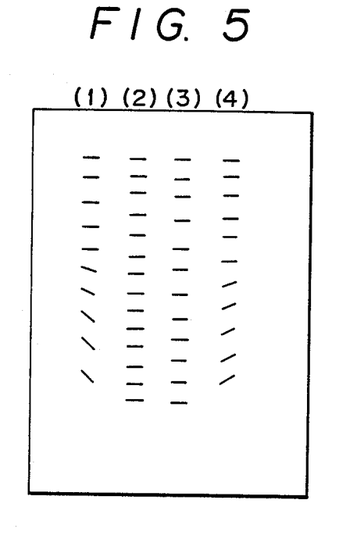
FIG. 5 shows an example of the electrophoretic pattern which is obtained by making correction for offset distortion on the pattern shown in FIG. 4.

FIG. 5 shows an electrophoretic pattern obtained by making correction for the offset distortion on the pattern shown in FIG. 4. The pattern only shows the smiling phenomenon.

Preferably, the uppermost band should be chosen as the arbitrary band to reduce the number of the above operation repeatedly carried out, because the correction can be easily made irrespective of the smiling phenomenon when the position to be fixed with the cursor point is taken a position horizontal to the electrophoresis-starting position of a lane (reference lane) where the offset distortion is not caused.

In this way, the offset correction is made on all slots in order.

In the fifth step, the digital signals corresponding to the offset-corrected bands $B'_{ny}$ are subjected to processing of correction for the smiling phenomenon (correction for migration distance) based on the input band information.

The cursor point is put upon the electrophoresis-starting position of a lane where the smiling is caused, to recognize the position. Then, the cursor point is put upon an arbitrary band position on said lane to recognize that position, and the cursor point is moved downward along the lane and fixed to an appropriate position. By this operation, information on correction that said band position is changed to the cursor-fixed position (namely, the position into which the base-specific DNA fragment would be inherently electrophoresed, if the smiling phenomenon was not caused) is input.

The smiling phenomenon is due to a difference in the migration rate between the slots depending upon that a gel temperature difference is caused by the edge effect of the gel support medium, etc. The above input information comprising the actual electrophoretic coordinate and the virtual electrophoretic coordinate is respectively substituted for the coordinate y" of the formula (I), a ratio of the actual migration rate a to the virtual migration rate a' (migration rate in the case where the smiling phenomenon would not be caused) is calculated. The correction for the electrophoretic coordinate is made on all bands on the lane based on said ratio, whereby the whole of the band positions on the lanes can be extended downward at the constant ratio.

The result of the smiling correction can be confirmed by superposing the corrected $B''_{ny}$ on the original pattern to fix the input information to the final. When the smiling correction is not completely made (insufficient or over-corrected), the above-described operation can be repeated, whereby the desired information is finally input.

Figure 6:
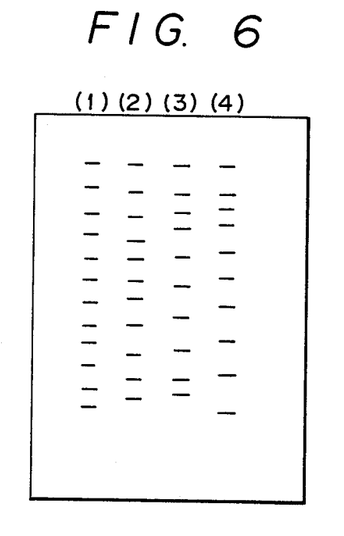
FIG. 6 shows an example of the electrophoretic pattern which is is obtained by making correction for smiling phenomenon on the pattern shown in FIG. 5.

FIG. 6 shows an electrophoretic pattern obtained by making correction for the smiling phenomenon on the pattern shown in FIG. 5.

Preferably, the lowermost band should be chosen as the arbitrary band to reduce the number of the above operation repeatedly carried out, because electrophoretic lag due to the smiling is maximized at the lowermost part and the position to be fixed with the cursor point is taken a position horizontal (or nearly horizontal) to the position of the final band in the central lane where the smiling is hardly caused so that the correction can be easily made with high accuracy.

In this way, the smiling correction is made for all slots in order.

The bands $B''_{ny}$ between the slots are compared with each other with respect to the electrophoretic coordinate y" based on the offset-corrected and smiling-corrected digital signals, and the bands are rearranged in order of the electrophoretic coordinate. The slots (1) to (4) have information on terminal bases comprising (G), (A), (T) and (C), respectively. Accordingly, when the slot number of each band is replaced with the corresponding base, the base sequence of DNA can be obtained. For instance, the following scheme is obtained:

A - B - C - T - A - A - G - . . .

If desired, the analytical results can be confirmed by displaying the offset- and smiling-corrected band peaks on the screen in the superposed manner. Further, the obtained information on the DNA sequence may be displayed on the same screen. It is possible to partially modify the analytical results based on the display.

The above-described both correction in the fourth and fifth steps may be made in the contrary order, that is, the smiling correction may be made prior to the offset correction. Of course, when one of the offset distortion and the smiling phenomenon is caused, only one correction according thereto can be made.

The analytical results of the DNA sequence are not limited to the display mode shown above. If desired, it is possible to simultaneously display the intensity ($z''$) of each band as the relative amount of the electrophretic substances. Further, the mode can be displayed as an image together with the visualized image of the autoradiograph.

It is further possible to perform the processing for genetic philological information such as comparison processing between the obtained DNA sequence and other DNA sequences which have been already determined and recorded.

The results on the analysis of the base sequence of DNA determined by the above-described signal processing is outputted from the signal processing circuit and transmitted to a recording device, directly or optionally via storage in a storage means such as a magnetic disk or a magnetic tape.

Various recording devices based on various systems can be used for the above described purpose, for instance, a device for visualizing optically by scanning a photosensitive material with a laser beam, etc., a means for printing symbols and/or numerals displayed on CRT by means of video printer, and a means for visualizing on a heat-sensitive recording material using thermic rays.

While the above descriptions have been directed to the determination of the base sequence of DNA, the method for analyzing an autoradiograph of the present invention is not limited ot the cases where the samples are base-specific DNA fragments. The present invention can be applied to the analysis of the resolved patterns of radioactively labeled substances one-dimensionally resolved on a support medium by various resolution methods. Particularly, the method of the present invention is suitable for use in the microanalysis of proteins and the screening of gene.

We claim:

1. A method for analyzing an autoradiograph by subjecting digital signals corresponding to an autoradiograph having information on two-dimensional location of radioactively labeled substances resolved on a support medium to signal processing, to obtain the locational information on the radioactively labeled substances in the form of visual indicia, that includes the steps of:
   (1) electrically displaying the autoradiograph in the form of an image on the basis of the digital signals;
   (2) extracting signals in a given area along resolved rows of the radioactively labeled substances on the basis of input information on the rows determined from the display image; and
   (3) subjecting the extracted signals to one-dimensional signal processing to detect resolved portions.

2. The method for analyzing an autoradiograph as claimed in claim 1, in which said obtained locational information on the radioactively labeled substances is confirmed by superimposing the locational information on the displayed autoradiograph after said third step.

3. The method for analyzing an autoradiograph as claimed in claim 1, in which said digital signals corresponding to the autoradiograph are obtained by placing said support medium and a stimulable phosphor sheet comprising a stimulable phosphor together in layers to record the autoradiograph of the radioactively labeled substances on the phosphor sheet as an energy-stored image, then irradiating said phosphor sheet with stimulating rays and photoelectrically detecting the autoradiograph as stimulated emission.

4. The method for analyzing an autoradiograph as claimed in claim 1, in which said digital signals corresponding to the autoradiograph are obtained by placing said support medium and a radiosensitive material together in layers to record the autoradiograph of the radioactively labeled substances on the radiosensitive material as a visible image and photoelectrically reading out the autoradiograph visualized on said radiosensitive material.

5. The method for analyzing an autoradiograph as claimed in claim 1, in which said radioactively labeled substances are biopolymers, labeled with a radioactive element.

6. The method for analyzing an autoradiograph as claimed in claim 5, in which said biopolymers are nucleic acids, biopolymer derivatives, biopolymer cleavage products or synthetic products, and said obtained locational information shows base sequence thereof.

7. The method for analyzing an autoradiograph as claimed in claim 1, where said input information includes information on the inclination of the pattern determined from said display image after the first step but before the second step, and where a selected pattern of said radioactively labeled substances is first rotated on the basis of said input information and then displayed.

8. A method for analyzing an autoradiograph by subjecting digital signals corresponding to an autoradiograph having information on two-dimensional location of radioactively labeled substances resolved on a support medium to signal processing, to obtain the locational information on the radioactively labeled substances in the form of visual indicia, that includes the steps of:
   (1) electrically displaying the autoradiograph in the form of an image on the basis of the digital signals;
   (2) extracting signals in a given area along resolved rows of the radioactively labeled substances on the basis of input information on the rows determined from the display image;
   (3) subjecting the extracted signals to one-dimensional signal processing to detect resolved portions and displaying them in the superimposing form; and
   (4) making correction for resolving distance on signals corresponding to the resolved portions on the basis of input information on location of one resolved portion determined from the display image.

9. The method for analyzing an autoradiograph as claimed in claim 8, in which said obtained locational information on the radioactively labeled substances is confirmed by superimposing the locational information on the displayed autoradiograph after said fourth step.

10. The method for analyzing an autoradiograph as claimed in claim 8, in which said digital signals corresponding to the autoradiograph are obtained by placing said support medium and a stimulable phosphor sheet comprising a stimulable phosphor together in layers to record the autoradiograph of the radioactively labeled substances on the phosphor sheet as an energy-stored image, then irradiating said phosphor sheet with stimulating rays and photoelectrically detecting the autoradiograph as stimulated emission.

11. The method for analyzing an autoradiograph as claimed in claim 8, in which said digital signals corresponding to the autoradiograph are obtained by placing said support medium and a radiosensitive material together in layers to record the autoradiograph of the radioactively labeled substances on the radiosensitive material as a visible image and photoelectrically reading out the autoradiograph visualized on said radiosensitive material.

12. The method for analyzing an autoradiograph as claimed in claim 8, in which said radioactively labeled substances are biopolymers labeled with a radioactive element.

13. The method for analyzing an autoradiograph as claimed in claim 12, in which said biopolymers are nucleic acids, biopolymer derivatives, biopolymer cleavage products or synthetic products, and said obtained locational information shows base sequence thereof.

14. The method for analyzing an autoradiograph as claimed in claim 8, where said input information includes information on the inclination of the pattern determined from said display image after the first step but before the second step, and where a selected pattern of said radioactively labeled substances is first rotated on the basis of said input information and then displayed.

15. A method for analyzing an autoradiograph by subjecting digital signals corresponding to an autoradiograph having information on two-dimensional location of radioactively labeled substances resolved on a support medium to signal processing, to obtain the locational information on the radioactively labeled substances in the form of visual indicia, that includes the steps of:
(1) electrically displaying the autoradiograph in the form of an image on the basis of the digital signals;
(2) extracting signals in a given area along resolved rows of the radioactively labeled substances on the basis of input information on the rows determined from the display image;
(3) subjecting the extracted signals to one-dimensional signal processing to detect resolved portions and displaying them in the superimposing form; and
(4) making correction for resolution-starting position on signals corresponding to the resolved portions on the basis of input information on location of one resolved portion determined from the display image.

16. The method for analyzing an autoradiograph as claimed in claim 15, in which said obtained locational information on the radioactively labeled substances is confirmed by superimposing the locational information on the displayed autoradiograph after said fourth step.

17. The method for analyzing an autoradiograph as claimed in claim 15, in which said digital signals corresponding to the autoradiograph are obtained by placing said support medium and a stimulable phosphor sheet comprising a stimulable phosphor together in layers to record the autoradiograph of the radioactively labeled substances on the phosphor sheet as an energy-stored image, then irradiating said phosphor sheet with stimulating rays, and photoelectrically detecting the autoradiograph as stimulated emission.

18. The method for analyzing an autoradiograph as claimed in claim 15, in which said digital signals corresponding to the autoradiograph are obtained by placing said support medium and a radiosensitive material together in layers to record the autoradiograph of the radioactively labeled substances on the radiosensitive material as a visible image and photoelectrically reading out the autoradiograph visualized on said radiosensitive material.

19. The method for analyzing an autoradiograph as claimed in claim 15, in which said radioactively labeled substances are biopolymers labeled with a radioactive element.

20. The method for analyzing an autoradiograph as claimed in claim 19, in which said biopolymers are nucleic acids, biopolymer derivatives, biopolymer cleavage products or synthetic products, and said obtained locational information shows base sequence thereof.

21. The method for analyzing an autoradiograph as claimed in claim 15, where said input information includes information on the inclination of the pattern determined from said display image after the first step but before the second step, and where a selected pattern of said radioactively labeled substances is first rotated on the basis of said input information and then displayed.

22. A method for analyzing an autoradiograph by subjecting digital signals corresponding to an autoradiograph having information on two-dimensional location of radioactively labeled substances resolved on a support medium to signal processing, to obtain the locational information on the radioactively labeled substances in the form of visual indicia, that includes the steps of:
(1) electrically displaying the autoradiograph in the form of an image on the basis of the digital signals;
(2) extracting signals in a given area along resolved rows of the radioactively labeled substances on the basis of input information on the rows determined from the display image;
(3) subjecting the extracted signals to one-dimensional signal processing to detect resolved portions and displaying them in the superimposing form;
(4) making correction for resolving distance on signals corresponding to the resolved portions on the basis of input information on location of one resolved portion determined from the display image and displaying them in the superposed form; and
(5) making correction for resolution-starting position on the distance-corrected signals on the basis of input information on location of one resolved portion determined from the display image.

23. The method for analyzing an autoradiograph as claimed in claim 22, in which said obtained locational information on the radioactively labeled substances is confirmed by superimposing the locational information on the displayed autoradiograph after said fifth step.

24. The method for analyzing an autoradiograph as claimed in claim 22, in which said digital signals corresponding to the autoradiograph are obtained by placing said support medium and a stimulable phosphor sheet comprising a stimulable phosphor together in layers to record the autoradiograph of the radioactively labeled substances on the phosphor sheet as an energy-stored image, then irradiating said phosphor sheet with stimulating rays and photoelectrically detecting the autoradiograph as stimulated emission.

25. The method for analyzing an autoradiograph as claimed in claim 22, in which said digital signals corresponding to the autoradiograph are obtained by placing said support medium and a radiosensitive material together in layers to record the autoradiograph of the radioactively labeled substances on the radiosensitive material as a visible image and photoelectrically reading out the autoradiograph visualized on said radiosensitive material.

26. The method for analyzing an autoradiograph as claimed in claim 22, in which said radioactively labeled substances are biopolymers labeled with a radioactive element.

27. The method for analyzing an autoradiograph as claimed in claim 26, in which said biopolymers are nucleic acids, biopolymer derivatives, biopolymer cleavage products or synthetic products, and said obtained locational information shows base sequence thereof.

28. The method for analyzing an autoradiograph as claimed in claim 22, where said input information includes information on the inclination of the pattern determined from said display image after the first step but before the second step, and where a selected pattern of said radioactively labeled substances is first rotated on the basis of said input information and then displayed.

29. A method for analyzing an autoradiograph by subjecting digital signals corresponding to an autoradiograph having information on two-dimensional location of radioactively labeled substances resolved on a support medium to signal processing, to obtain the locational information on the radioactively labeled substances in the form of visual indicia, that includes the steps of:
  (1) electrically displaying the autoradiograph in the form of an image on the basis of the digital signals;
  (2) extracting signals in a given area along resolved rows of the radioactively labeled substances on the basis of input information on the rows determined from the display image;
  (3) subjecting the extracted signals to one-dimensional signal processing to detect resolved portions and displaying them in the superimposing form;
  (4) making correction for resolution-starting position on signals corresponding to the resolved portions on the basis of input information on location of one resolved portion determined from the display image and displaying them in the superposed form; and
  (5) making correction for resolving distance on the starting position-corrected signals on the basis of input information on location of one resolved portion determined from the display image.

30. The method for analyzing an autoradiograph as claimed in claim 29, in which said obtained locational information on the radioactively labeled substances is confirmed by superimposing the locational information on the displayed autoradiograph after said fifth step.

31. The method for analyzing an autoradiograph as claimed in claim 29, in which said digital signals corresponding to the autoradiograph are obtained by placing said support medium and a stimulable phosphor sheet comprising a stimulable phosphor together in layers to record the autoradiograph of the radioactively labeled substances on the phosphor sheet as an energy-stored image, then irradiating said phosphor sheet with stimulating rays and photoelectrically detecting the autoradiograph as stimulated emission.

32. The method for analyzing an autoradiograph as claimed in claim 29, in which said digital signals corresponding to the autoradiograph are obtained by placing said support medium and a radiosensitive material together in layers to record the autoradiograph of the radioactively labeled substances on the radiosensitive material as a visible image and photoelectrically reading out the autoradiograph visualized on said radiosensitive material.

33. The method for analyzing an autoradiograph as claimed in claim 29, in which said radioactively labeled substances are biopolymers labeled with a radioactive element.

34. The method for analyzing an autoradiograph as claimed in claim 33, in which said biopolymers are nucleic acids, biopolymer derivatives, biopolymer cleavage products or synthetic products, and said obtained locational information shows base sequence thereof.

35. The method for analyzing an autoradiograph as claimed in claim 29, where said input information includes information on the inclination of the pattern determined from said display image after the first step but before the second step, and where a selected pattern of said radioactively labeled substances is first rotated on the basis of said input information and then displayed.

* * * * *